(12) United States Patent
Crocker et al.

(10) Patent No.: US 7,160,832 B2
(45) Date of Patent: Jan. 9, 2007

(54) CATALYST SYSTEM FOR GENERATING CARBON MONOXIDE FOR USE WITH AUTOMOTIVE CATALYSTS

(75) Inventors: Mark Crocker, Lathrup Village, MI (US); Thierry Leprince, Toronto (CA); Takeshi Matsumoto, Tochigi (JP); Takuji Nakaene, Himeji Hyogo (JP)

(73) Assignee: Umicore AG & Co. KG, Hanau-Wolfgang (DE)

( * ) Notice: Subject to any disclaimer, the term of this patent is extended or adjusted under 35 U.S.C. 154(b) by 194 days.

(21) Appl. No.: 10/462,126

(22) Filed: Jun. 16, 2003

(65) Prior Publication Data

US 2004/0254062 A1 Dec. 16, 2004

(51) Int. Cl.
*B01J 29/072* (2006.01)

(52) U.S. Cl. .......................... 502/71; 502/64
(58) Field of Classification Search .................. 502/64, 502/71

See application file for complete search history.

(56) References Cited

U.S. PATENT DOCUMENTS

| | | | |
|---|---|---|---|
| 5,279,997 A | 1/1994 | Montreuil et al. | |
| 5,371,056 A | 12/1994 | Leyrer et al. | |
| 5,610,117 A | 3/1997 | Horiuchi et al. | |
| 5,727,385 A | 3/1998 | Hepburn | |
| 6,089,015 A * | 7/2000 | Strehlau et al. | 60/274 |
| 6,103,660 A | 8/2000 | Yperen et al. | |
| 6,182,443 B1 | 2/2001 | Jarvis et al. | |
| 6,508,057 B1 * | 1/2003 | Bouchez et al. | 60/286 |

FOREIGN PATENT DOCUMENTS

| | | |
|---|---|---|
| EP | 0499087 | 8/1992 |
| EP | 0778072 | 11/1997 |
| EP | 0924400 | 6/1999 |
| EP | 1 123 729 A2 | 8/2001 |
| FR | 2783280 | 3/2000 |
| GB | 2333471 * | 7/1999 |

OTHER PUBLICATIONS

Michon et al., "Application of a NOx Trap for Emission Reduction of a Heavy-Duty Engine," pp. 248-267, no date.
Haber et al., "Methods and Procedures for Catalyst Characterization," Handbook of Heterogeneous Catalysis, pp. 1529-1533 (1995).
Bailey, O., "NOx Adsorbers for Diesel Applications: General Considerations and Operational Issues," www.dieselnet.com Technical Reports, pp. 1-8 (Dec. 1997).
Pârvulescua et al., "Catalytic Removal of NO," Catalysis Today, vol. 46, pp. 233-316 (1998).
Car et al., "The Mechanism of the Selective Reduction of Nitrogen Oxides by Hydrocarbons on Zeolite Catalysts," Catalysis Today, vol. 63, pp. 133-146 (2000).
Ciambelli, et al., "Potentialities and Limitations of Lean de-NOx Catalysts in Reducing Automotive Exhaust Emissions," Catalysis Today, vol. 59, pp. 279-286 (2000).
Schenk et al., "High-Efficiency NOx and PM Exhaust Emission Control for Heavy-Duty On-Highway Diesel Engines—Part Two," Diesel Emissions Control Systems (2001).
Cartus et al., "The Clean and Efficient HSDI-Diesel using NOx-Adsorber Technology," pp. 240-263, no date.

* cited by examiner

*Primary Examiner*—Elizabeth D. Wood
(74) *Attorney, Agent, or Firm*—Scott D. Locke; Kalow & Springut LLP

(57) ABSTRACT

The present invention provides a catalyst system that may be used to regenerate $NO_x$ adsorber catalysts. It also provides methods for using these catalysts. According to the present invention, hydrocarbons are introduced into an exhaust gas stream upstream of a metal ion exchanged zeolite catalyst to generate CO. The metal ion exchanged zeolite catalyst is preferably a Cu-ZSM-5 catalyst that has a high loading of copper. The hydrocarbons are oxidized to carbon monoxide, and the carbon monoxide is then exposed to a $NO_x$ adsorber catalyst, which facilitates regeneration of that catalyst.

4 Claims, 1 Drawing Sheet

FIG. 1A
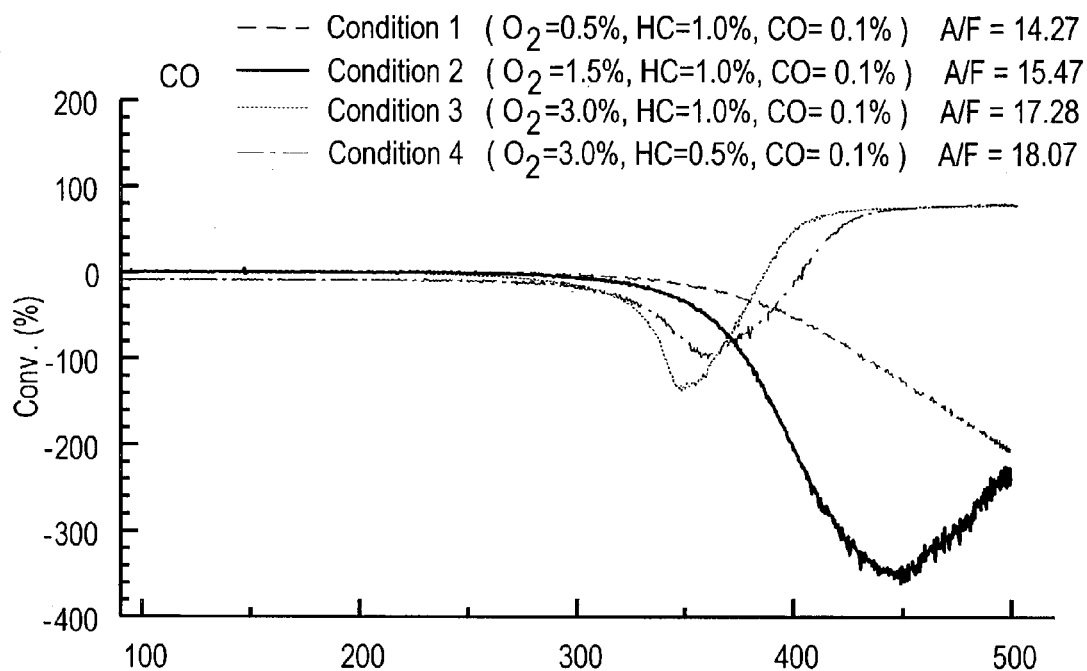
--- Condition 1 ( $O_2$=0.5%, HC=1.0%, CO= 0.1% )   A/F = 14.27
— Condition 2 ( $O_2$=1.5%, HC=1.0%, CO= 0.1% )   A/F = 15.47
····· Condition 3 ( $O_2$=3.0%, HC=1.0%, CO= 0.1% )   A/F = 17.28
—·— Condition 4 ( $O_2$=3.0%, HC=0.5%, CO= 0.1% )   A/F = 18.07
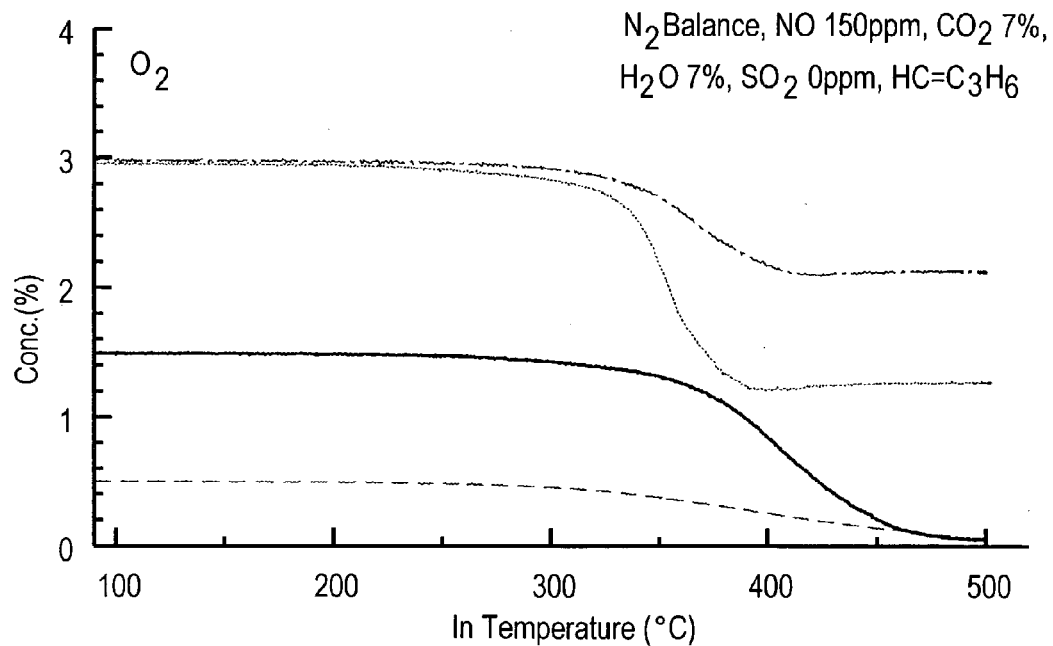
$N_2$ Balance, NO 150ppm, $CO_2$ 7%, $H_2O$ 7%, $SO_2$ 0ppm, HC=$C_3H_6$
FIG. 1B
Catalyst: A, Conversions: (+)= decrease, ( - )= increase

CATALYST SYSTEM FOR GENERATING CARBON MONOXIDE FOR USE WITH AUTOMOTIVE CATALYSTS

FIELD OF THE INVENTION

The present invention relates to the regeneration of $NO_x$ adsorber catalysts, methane combustion catalysts and $NO_x$ coated diesel particulate filters.

BACKGROUND OF THE INVENTION

Under standard operating conditions, automotive engines generate undesirable gases such as carbon monoxide (CO), hydrocarbons and nitrogen oxides ($NO_x$). In order to reduce the emission of these gases into the atmosphere, automobile manufacturers have for a number of years, employed catalysts that facilitate the conversion of these substances into less noxious compounds.

There are many different types of catalysts, and the different types of catalysts may be used individually or in certain circumstances in combination. The selection of the type of catalyst or catalysts to use in a given application, in part, depends upon the conditions under which the engine in which it will be used will operate.

An automotive engine can operate under either rich or lean conditions or under alternating periods of rich and lean conditions. A rich operating condition refers to a condition in which there is a normalized air:fuel ratio of less than 1. By contrast, a lean operating condition refers to a condition in which there is a normalized air:fuel ratio of greater than 1. Diesel engines, for example, typically operate under lean conditions. By contrast, gasoline engines typically operate under stoichiometric conditions, i.e. the normalized air:fuel ratio is approximately 1. The concepts of rich and lean operating conditions are well known to persons skilled in the art.

One type of catalyst that is used in automotive engines and that is well known to persons skilled in the art is the three-way catalyst. Three-way catalysts, when operated under stoichiometric conditions are efficient at treating CO, hydrocarbons and $NO_x$. Under these conditions, a three-way catalyst can efficiently convert CO, hydrocarbons and $NO_x$, into $CO_2$, $H_2O$ and $N_2$. However, although three-way catalysts are efficient at treating all of the aforementioned substances under stoichiometric conditions, under lean conditions, they are not efficient at converting $NO_x$ into $N_2$.

There are certain $NO_x$ catalysts that can treat nitrogen oxides under lean conditions. These types of catalysts include metal ion-exchanged zeolite materials, which are also well known to persons skilled in the art. In these types of catalysts, there is selective reduction of $NO_x$ to $N_2$. However, metal ion-exchanged zeolite materials are only moderately efficient at converting $NO_x$ into $N_2$, and they are not efficient at converting CO and hydrocarbons into less harmful substances.

Another type of catalyst that removes $NO_x$ during lean conditions is the $NO_x$ storage catalyst, also referred to as a $NO_x$ trap or $NO_x$ adsorber catalyst. A $NO_x$ adsorber catalyst typically operates in two phases. First, during lean burn operation, nitrogen oxides, after being oxidized to $NO_2$, are stored, for example, in the form of barium nitrate. Second, during rich operations, the nitrogen oxides are de-stored and treated. This type of catalyst relies upon the adsorption of $NO_2$ onto the catalyst in the form of nitrates. However, under lean operating conditions, the $NO_2$ portion of the exhaust relative to NO is small, $NO_2$:NO is approximately 1:9, and $NO_x$ adsorber catalysts cannot effectively adsorb NO.

In order to improve the operation of the $NO_x$ adsorber catalyst, an oxidation function is built into the $NO_x$ storage catalyst, typically, in the form of a precious metal catalyst in order to oxidize NO to $NO_2$. Additionally, an oxidation catalyst may be installed upstream of the $NO_x$ adsorber catalyst to further assist the conversion of NO to $NO_2$.

When operating a $NO_x$ adsorber catalyst, one must periodically regenerate it. During regeneration, the stored nitrates are desorbed from the $NO_x$ adsorber catalyst in the form of $NO_x$ and transformed into nitrogen by reaction with the reductants in the exhaust gas. In many known processes, regeneration events take place approximately 10% of the time, and occur under rich operating conditions. During these regeneration processes, $NO_2$ is reduced to $N_2$ over the precious metals in the catalyst, as is typical in a traditional three-way catalyst.

Unfortunately, it is not easy to produce a rich environment in a lean burn engine. One known method is to run the lean burn engine under rich conditions by internal management alone. However, this method is complex and requires extensive engine recalibration. Further, it may prove particularly challenging in the case of heavy-duty diesel engines. Thus, it can be cumbersome and costly.

Another well-known method is to inject secondary reactants in the exhaust stream upstream of the $NO_x$ adsorber catalyst. By injecting secondary reactants at the appropriate place, one is able to achieve a rich environment without interfering with engine calibration.

For $NO_x$ adsorber catalysts, the preferred reductants are, in order of decreasing desirability based on effectiveness, $H_2$>CO>hydrocarbons. However, it is impractical to store large quantities of $H_2$ and CO in a vehicle. Consequently, practical constraints dictate that hydrocarbons stored in an automobile as fuel function as the reductant.

Due to the limitations of the aforementioned methods for regenerating $NO_x$ adsorber catalysts, there is a need to develop improved operating systems and methods for regeneration of these types of catalysts. As more stringent environmental regulations are adopted, this demand is increasing. The present invention provides a solution to regenerating $NO_x$ adsorber catalyst according to a method that will permit compliance with more stringent environmental regulations.

SUMMARY OF THE INVENTION

The present invention provides a catalyst system that facilitates the regeneration of a $NO_x$ adsorber catalyst, as well as methods for regenerating a $NO_x$ adsorber catalyst. Through either the use of the catalyst system or the methods described below, one is able to generate CO upstream of a $NO_x$ adsorber catalyst. This CO may be used to reduce compounds that are stored in the $NO_x$ adsorber catalyst and to regenerate the catalyst. The present invention may also be used in connection with methane combustion catalysts that have been sulfated, and $NO_x$ coated diesel particulate filters.

In one embodiment, the present invention provides a catalyst system comprising: (a) a metal ion exchanged zeolite catalyst; (b) a hydrocarbon addition apparatus, wherein said hydrocarbon addition apparatus is located upstream of said metal ion exchanged zeolite catalyst; and (c) a nitrogen oxide adsorber catalyst, wherein said nitrogen oxide adsorber catalyst is located downstream of said metal ion exchanged zeolite catalyst. Under this embodiment, preferably the metal ion exchanged zeolite catalyst is a Cu-ZSM-5 catalyst.

In a second embodiment, the present invention provides a method of increasing the CO content of an exhaust stream and using the CO to regenerate a $NO_x$ adsorber catalyst. This method comprises: (a) adding hydrocarbons to an exhaust gas stream; (b) exposing said exhaust gas stream to a metal ion exchanged zeolite catalyst; and (c) regenerating a $NO_x$ adsorber catalyst.

In this embodiment, the hydrocarbons are oxidized to carbon monoxide. This increased level of carbon monoxide is then used to regenerate the $NO_x$ adsorber catalyst. Because carbon monoxide is a more desirable reductant than hydrocarbons, the present invention improves the efficiency of the regeneration of the $NO_x$ adsorber catalyst.

BRIEF DESCRIPTION OF THE FIGURE

FIG. 1 is a representation of the performance of a catalyst system of the present invention under four different operating conditions. FIG. 1a is a representation of the conversion of carbon monoxide as a function of temperature for a particular catalyst. FIG. 1b is a representation of the corresponding oxygen concentration in these experiments as measured at the reactor output.

DETAILED DESCRIPTION OF THE INVENTION

This disclosure is not intended to be a primer on exhaust gas catalysts. Basic concepts are known to persons skilled in the art and are not repeated herein.

The present invention provides a catalyst system for use in the regeneration of $NO_x$ adsorber catalysts, as well as methods that enable the regeneration of $NO_x$ adsorber catalysts through the addition of hydrocarbons either directly or indirectly into the exhaust gas stream of an automotive engine. The exhaust gas stream may be generated either from diesel or standard gasoline engines, and the hydrocarbons that are added are converted into carbon monoxide, which in turn facilitates regeneration of the $NO_x$ adsorber catalyst. The present invention may also be used in connection with natural gas engines, which would be particularly advantageous when desulfating methane combustion catalysts.

Under one embodiment, the present invention provides a catalyst system that facilitates the regeneration of a $NO_x$ adsorber catalyst. The catalyst system comprises a metal ion exchanged zeolite catalyst, a hydrocarbon addition apparatus and a $NO_x$ adsorber catalyst.

Metal ion exchanged zeolite catalysts are well known to persons skilled in the art and may, for example, comprise at least one metal selected from the group consisting of copper, iron and cobalt. The types of metal ion exchanged zeolite catalysts that may be useful in connection with the present invention include but are not limited to ZSM-5, ZSM-11, beta, fenierite, and mordenite. Preferably, the Si/Al mole ratio in the zeolite will be 10–200, more preferably 20–80. Additionally, preferably, the metal is copper, and more preferably the catalyst is a Cu-ZSM-5 catalyst. The use and manufacturing of Cu-ZSM-5 catalysts, as well as of other metal ion exchanged zeolite catalysts are well known to persons skilled in the art. A general discussion of metal ion exchanged zeolite catalysts is provided in *Catalytic removal of NO*, Parvulescu et al., Catalysis Today. 46:233–316 at 277–286 (1998), which is incorporated by reference.

The amount of metal ion in a metal ion exchanged zeolite catalyst may be expressed as the percentage exchange of the ions in the zeolite by the given metal ion. For example, a 200% exchanged zeolite catalyst refers to the exchange of twice the theoretical maximum based on the concentration of ion-exchange sites in the zeolite. In accordance with the present invention, metal ion loading ranges of between about 50% and about 400% exchanged are preferred, and between about 100% and about 300% are more preferred. Most preferred is between about 125% and about 275%.

The metal ion exchanged zeolite catalyst fulfills two functions. First, it is a catalyst for CO generation, which may be used to facilitate regeneration of a downstream $NO_x$ adsorber catalyst. Second, it is a catalyst for $NO_x$ reduction, using hydrocarbons as reductants. The hydrocarbons that are converted by the metal ion exchanged zeolite catalyst to CO may be present as unburnt or partially burnt exhaust from the engine and/or, as described below, added directly to the exhaust stream. There is an increased efficiency in regeneration of the $NO_x$ storage catalyst if the hydrocarbons are not combusted prior to contacting the metal ion exchanged zeolite catalyst. The methods for installing the metal ion exchanged zeolite catalyst include methods that are now known or that from reading this disclosure, one skilled in the art would appreciate would be beneficial to use with the present invention.

The catalyst system of the present invention also contains a hydrocarbon addition apparatus that permits the introduction of hydrocarbons either directly or indirectly into the exhaust gas stream of an engine. Any apparatus for adding hydrocarbons to an exhaust stream that is now known or that comes to be known and from reading this disclosure one skilled in the art would appreciate as beneficial to use with the present invention may be used. Preferably, the hydrocarbon addition apparatus is located upstream of the metal ion exchanged zeolite catalyst. Examples of hydrocarbon addition apparatuses include but are not limited to an in-cylinder with late cycle injection apparatus and a secondary fuel injector located inside the exhaust stream. In the former instance, a portion of the hydrocarbons will be burned by the engine, i.e., there will be partial combustion, but the remainder will enter the exhaust stream. The methods for installing the hydrocarbon addition apparatus include any method that is now known or that from reading this disclosure, it becomes apparent would be beneficial to use with the present invention.

The two aforementioned components of the catalyst system are located within an exhaust stream of an automotive engine and upstream of a $NO_x$ adsorber catalyst. $NO_x$ adsorber catalysts are well known to persons skilled in the art and may be synthesized from well-known methods or purchased from commercial vendors. Typically, the distance between the components is dictated by spacing requirements, and the components are positioned where there is sufficient space in the engine compartment and/or under the vehicle. The methods for installing $NO_x$ adsorber catalysts are well known to persons skilled in the art.

When the metal ion exchanged zeolite catalyst is a Cu-ZSM-5 catalyst, preferably the operating temperature is between 300° C. and 550° C., more preferably between 350° C. and 500° C., and most preferably between 400° C. and 500° C. The process for increasing the CO concentration will preferably be done at approximately atmospheric pressure, and under operating conditions that permit a gas hourly space velocity of approximately 5,000–500,000 $h^{-1}$, and more preferably between 30,000 and 100,000 $h^{-1}$. The phrase "gas hourly space velocity" refers to the volume of gas that passes through the volume of catalyst per hour.

According to a second embodiment, a method is provided for increasing the amount of carbon monoxide in an exhaust gas stream via a hydrocarbon addition apparatus. The hydrocarbon addition apparatus adds hydrocarbons to the exhaust gas stream. These hydrocarbons are exposed to a metal ion exchanged zeolite catalyst, which oxidizes the hydrocarbons to carbon monoxide. This carbon monoxide may then be carried to the $NO_x$ storage catalyst, whereby it facilitates the desorption and reduction of the stored $NO_2$ to $N_2$, while the CO itself is oxidized to $CO_2$.

The types of hydrocarbons that may be used include, but are not limited to diesel fuel and gasoline, and may, for example, be chemical species such as, alkanes, alkenes, and alkynes with for example, one to eighteen carbons atoms. Preferably, one uses enough hydrocarbons to obtain a net rich fuel gas mixture at the time that the hydrocarbons are exposed to the metal ion exchanged zeolite catalyst. At the same time, one wants to avoid making the exhaust too rich in order to avoid emitting unacceptable amounts of CO and hydrocarbons to the atmosphere. Further, in order to conserve fuel it is desirable to limit the amount of hydrocarbons that are released from the hydrocarbon addition apparatus to the minimum amount that is sufficient to regenerate the nitrogen oxide adsorber catalyst.

Preferably, one increases the amount of CO by converting at least 50%, more preferably between 50% and 70% and most preferably between 60% and 70% of the hydrocarbons released from the hydrocarbon addition apparatus into CO.

The increased carbon monoxide facilitates the de-storage of the nitrogen oxides that are stored in the nitrogen adsorber catalyst. Upon being de-stored, the nitrogen oxides are treated and converted into $N_2$.

The aforementioned catalyst systems and methods may be used in automotive systems in which $NO_x$ adsorber catalysts are currently used, as well as in other diesel operations, including but not limited to applications such as generating sets for back-up generators. The present invention is particularly useful in heavy duty applications in which there is a hydrocarbon addition apparatus that is in cylinder with post injection.

As persons skilled in the art are aware, a $NO_x$ adsorber catalyst can be operated in either a single or a dual leg system. In a single leg system, one typically regenerates the adsorber catalyst by injecting hydrocarbons in cylinder to make the engine run rich. In a dual leg system one splits the exhaust into two halves, each with a $NO_x$ catalyst. While one catalyst adsorbs, the other can be regenerated. Thus, one could send 5% of the exhaust to the regeneration catalyst and add hydrocarbons to make it rich, while the other catalyst operates under normal conditions. An example of dual leg (or dual path) system is described in SAE Technical Paper, 2001-01-3619, *High Efficiency $NO_x$ and PM Exhaust Emission Control for Heavy Duty On-Highway Diesel Engines, —Part Two*, Sep. 24–27, 2001, which is incorporated by reference. The present invention may be used in either system.

Additionally, one could use the present invention in conjunction with an oxidation catalyst that is inserted upstream of the $NO_x$ adsorber catalyst and oxidizes NO to $NO_2$. However, one would need to ensure that the oxidation catalyst does not simultaneously convert all of the CO to $CO_2$.

Having generally described the invention, the same may be more readily understood through the following examples. These examples are not intended to limit the scope of the invention in any way.

EXAMPLES

Comparative Example 1

1) Preparation of Cu-ZSM-5 Reference Catalyst:

A mixture of copper(II) acetate monohydrate (40 g), H-ZSM-5 (1008 g, Si/Al ratio of 80) and de-ionized water (158 g) was stirred at room temperature for 30 minutes. The resulting slurry was dried at 120° C. overnight. The resulting powder was calcined in air at 500° C. for 1 h. A coating dispersion was obtained by mixing 844 g of the calcined powder with 821 g silica sol (20–21 wt % $SiO_2$ in water, pH=9–10) and 968 g de-ionized water. The mixture was wet pulverized to form a slurry. A monolithic ceramic carrier possessing 400 cells per square inch was coated by immersing it in the slurry so as to wet it completely. Excess slurry was removed by blowing air through the carrier, after which it was dried (120° C., 2 h) and calcined in air (600° C., 2 h). The conversion of hydrocarbons to carbon monoxide by this catalyst are summarized in Table I.

2) Preparation of Catalyst A:

To a stirred mixture of copper(II) nitrate trihydrate (86 g), ammonium dihydrogen phosphate (12 g), silica sol (1002 g, 20–21 wt % $SiO_2$, pH=2–4) and de-ionized water (356 g) was added H-ZSM-5 (580 g, Si/Al=80) and zeolite beta (231 g, ammonium ion form, Si/Al=25). The mixture was wet pulverized to form a coating slurry. A monolithic carrier was coated with the slurry as described in Example 1. The conversion of hydrocarbons to carbon monoxide by this catalyst are summarized in Table I.

3) Preparation of Catalyst B:

To a stirred mixture of copper(II) nitrate trihydrate (168 g), ammonium dihydrogen phosphate (12 g), silica sol (975 g, 20–21 wt % $SiO_2$, pH=2–4) and deionized water (520 g) was added ZSM-5 (591 g, ammonium ion form, Si/Al=70) and zeolite beta (225 g, ammonium ion form, Si/Al=25). The mixture was wet pulverized to form a slurry. A monolithic carrier was coated with the slurry as described in Example 1. The conversion of hydrocarbons to carbon monoxide by this catalyst are summarized in Table I.

4) Preparation of Catalyst C:

A mixture of copper(II) acetate monohydrate (211 g), ZSM-5 (1034 g, ammonium ion form, Si/Al ratio of 70) and de-ionized water (1375 g) was stirred at room temperature for 30 minutes. The resulting slurry was dried at 120° C. overnight. The resulting powder was calcined in air at 500° C. for 1 h. A coating dispersion was obtained by mixing 811 g of the calcined powder with 982 g silica sol (20–21 wt % $SiO_2$ in water, pH=9–10) and 85 g de-ionized water. The mixture was wet pulverized to form a slurry. A monolithic carrier was coated with the slurry as described in Example 1. The conversion of hydrocarbons to carbon monoxide by this catalyst are summarized in Table I.

5) Preparation of Catalyst D:

A mixture of copper(II) acetate monohydrate (211 g), ZSM-5 (1025 g, ammonium ion form, Si/Al ratio of 70) and de-ionized water (1384 g) was stirred at room temperature for 30 minutes. The resulting slurry was dried at 120° C. overnight. The resulting powder was calcined in air at 500° C. for 1 h. A coating dispersion was obtained by mixing 793 g of the calcined powder with 958 g silica sol (20–21 wt % $SiO_2$ in water, pH=9–10), 70 g of magnesium sulfate and 452 g de-ionized water. The mixture was wet pulverized to form a slurry. A monolithic carrier was coated with the slurry as described in Example 1.

The aging conditions in Table I below were designed so that the catalysts were aged at a steady state at 550° C.; every 100 h the CO yield was measured at 400° C. and 450° C. and hydrocarbon was supplied to the exhaust gas for the CO measurement by means of secondary fuel injection. At 400° C. the HC in was 1700 ppm and the CO in was 150 ppm. At 450° C. the HC in was 1850 ppm and the CO in was 120 ppm. The HC concentration was measured as C1.

TABLE I

| Aging hrs | Catalyst A | Catalyst B | Catalyst C | Catalyst D | Cu-ZSM-5 |
|---|---|---|---|---|---|
| CO yield at 400° C. (in %) | | | | | |
| 0 | 68.8 | 68.7 | 56 | 53.8 | 55.1 |
| 100 | 51.3 | 58.7 | 52.1 | 48.1 | 41.9 |
| 200 | 59 | 64.7 | 49.4 | 44.1 | 35.3 |
| 300 | 53.6 | 59.6 | 46.9 | 42.6 | 33.8 |
| 400 | 51.8 | 53.6 | 50 | 45.3 | |
| 500 | 48.5 | 55.1 | 47.6 | 43 | |
| CO yield at 450° C. (in %) | | | | | |
| 0 | 47.2 | 32.8 | 35.4 | 48.6 | 42.2 |
| 100 | 42.6 | 41.7 | 36.6 | 43.1 | 39.9 |
| 200 | 59 | 60.3 | 43.5 | 47 | 41.4 |
| 300 | 54.1 | 58 | 45.6 | 46.3 | 38.5 |
| 400 | 51 | 55.5 | 46.7 | 49 | |
| 500 | 51.2 | 54.5 | 44.8 | 43.9 | |

All of the catalysts A–D have increased copper loadings, which are summarized in Table II below. As demonstrated in Table I above, at 400° C., except for the initial measurements (aging time=0), they all have greater carbon monoxide yields than the Cu-ZSM-5 reference catalyst. Similarly, at 450° C. except for the initial measurements and the operation of catalyst C at 100°, they all have greater carbon monoxide yields than the Cu-ZSM-5 reference catalyst and in time catalyst C as well has greater carbon monoxide yields.

As described in Proc. 22$^{nd}$ Int. Vienna Motor Symposium, April 2001, 248–267, which is incorporated by reference, the ability to increase the conversion of carbon monoxide leads to a greater ability to regenerate the $NO_x$ adsorber catalyst.

TABLE II

| Catalyst | $Cu^{2+}$ Loading Percentage |
|---|---|
| Cu-ZSM-5 Reference Catalyst | 97 |
| A | 136 |
| B | 250 |
| C | 150 |
| D | 151 |

TABLE III

| Condition No. | $O_2$ % | Hydrocarbon % | CO % | Air:Fuel Ratio (not normalized) |
|---|---|---|---|---|
| 1 | 0.5 | 1.0 | 0.1 | 14.27 |
| 2 | 1.5 | 1.0 | 0.1 | 15.47 |
| 3 | 3.0 | 1.0 | 0.1 | 17.28 |
| 4 | 3.0 | 0.5 | 0.1 | 18.07 |

Comparative Example 2

A catalyst made according to teaching of how to make catalyst A above was exposed to hydrocarbons under four different operating conditions that are summarized in Table III. In addition to the variables noted in Table III, the following conditions were constant: $N_2$ Balance, NO 150 ppm, $CO_2$ 7%, $H_2O$ 7%, $SO_2$ 0 ppm, hydrocarbon=$C_3H_6$. The carbon monoxide conversion and concentration of oxygen were measured as functions of time and the results appear in FIG. 1a and FIG. 1b respectively.

As the result FIG. 1a show, at the leaner operating conditions, in the range of 400–500° C. there is a significant improvement in the conversion of the hydrocarbons to carbon monoxide. Similarly, as shown in FIG. 1b, in this range there is a greater concentration of oxygen gas than there is when the catalyst is run under less lean operating conditions.

As described above, the ability to increase the conversion of carbon monoxide leads to greater ability to regenerate the $NO_x$ adsorber catalyst.

What is claimed:

1. A catalyst system comprising:
   a. a Cu-ZSM-5 catalyst, wherein said Cu-ZSM-5 catalyst has a copper loading between 125% and 275% exchanged;
   b. a hydrocarbon addition apparatus, wherein said hydrocarbon addition apparatus is upstream of said Cu-ZSM-5 catalyst; and
   c. a nitrogen oxide adsorber catalyst, wherein said nitrogen oxide adsorber catalyst is downstream of said Cu-ZSM-5 catalyst.

2. A catalyst system according to claim 1, wherein said hydrocarbon addition apparatus comprises an in-cylinder with a late cycle injection apparatus.

3. A catalyst system according to claim 1, wherein said hydrocarbon addition apparatus comprises a secondary fuel injector.

4. A catalyst system according to claim 1, wherein the secondary fuel injector is located in an exhaust pipe.

* * * * *